United States Patent
Kolesnik et al.

(10) Patent No.: US 10,684,837 B2
(45) Date of Patent: Jun. 16, 2020

(54) REPOSITORY MANAGER

(71) Applicant: Red Hat Israel, Ltd., Raanana (IL)

(72) Inventors: Michael Kolesnik, Ramat Gan (IL); Moti Asayag, Netanya (IL)

(73) Assignee: Red Hat Israel, LTD., Raanana (IL)

( * ) Notice: Subject to any disclaimer, the term of this patent is extended or adjusted under 35 U.S.C. 154(b) by 0 days.

(21) Appl. No.: 14/631,059

(22) Filed: Feb. 25, 2015

(65) Prior Publication Data

US 2016/0246583 A1 Aug. 25, 2016

(51) Int. Cl.
*G06F 9/445* (2018.01)
*G06F 8/61* (2018.01)
*G06F 9/455* (2018.01)
*G06F 16/14* (2019.01)

(52) U.S. Cl.
CPC .............. *G06F 8/61* (2013.01); *G06F 8/63* (2013.01); *G06F 9/45558* (2013.01); *G06F 16/148* (2019.01); *G06F 2009/45562* (2013.01); *G06F 2009/45583* (2013.01); *G06F 2009/45595* (2013.01)

(58) Field of Classification Search
CPC . G06F 8/61; G06F 16/148; G06F 8/63; G06F 9/45558
USPC ....................................................... 717/175
See application file for complete search history.

(56) References Cited

U.S. PATENT DOCUMENTS

| | | | | |
|---|---|---|---|---|
| 8,370,802 B2* | 2/2013 | Pacifici | ................ | G06F 9/5038 717/120 |
| 8,413,146 B1* | 4/2013 | McCorkendale | ... | G06F 9/45558 711/6 |
| 8,601,129 B2 | 12/2013 | Burckart et al. | | |
| 8,615,501 B2 | 12/2013 | Lorenz et al. | | |
| 8,839,221 B2 | 9/2014 | Sapuntzakis et al. | | |
| 8,850,432 B2 | 9/2014 | McGrath et al. | | |
| 8,875,124 B2 | 10/2014 | Kuzmack et al. | | |
| 8,924,930 B2* | 12/2014 | Fries | ................... | G06F 9/45558 717/101 |
| 8,990,809 B1* | 3/2015 | Jacob | ................. | G06F 9/45533 718/1 |
| 9,170,797 B2* | 10/2015 | Raman | ...................... | G06F 8/61 |
| 9,946,578 B2* | 4/2018 | Huang | ................... | H04L 67/14 |
| 2006/0070063 A1* | 3/2006 | Takashige | ................ | G06F 8/60 717/174 |
| 2007/0006218 A1* | 1/2007 | Vinberg | .................... | G06F 8/61 717/174 |

(Continued)

OTHER PUBLICATIONS

Brooks, Jason; Up and Running with oVirt 3.4; Red Hat Open Source Community blog; Mar. 31, 2014; 16 pgs.

(Continued)

*Primary Examiner* — Hiren P Patel

(74) *Attorney, Agent, or Firm* — Lowenstein Sandler LLP

(57) ABSTRACT

A system and method to install a software application on a host computer system using a file repository located on another host computer system. The method includes installing, on a first host computer system, a virtual machine image including a file repository including one or more prerequisites for installing a software application. The method further includes configuring a second host computer system with an identifier of the file repository. The method also includes installing the software application on a virtual machine associated with the second host computer system using the file repository.

20 Claims, 5 Drawing Sheets

(56) References Cited

U.S. PATENT DOCUMENTS

| | | | |
|---|---|---|---|
| 2007/0201655 A1* | 8/2007 | Shenfield | G06F 8/61 379/201.01 |
| 2009/0070752 A1* | 3/2009 | Alpern | G06F 8/443 717/148 |
| 2009/0100420 A1* | 4/2009 | Sapuntzakis | G06F 8/65 717/171 |
| 2011/0126197 A1 | 5/2011 | Larsen et al. | |
| 2011/0238984 A1* | 9/2011 | Roush | G06F 21/53 713/166 |
| 2011/0307531 A1* | 12/2011 | Gaponenko | G06F 8/63 707/822 |
| 2013/0263113 A1* | 10/2013 | Cavazza | G06F 8/63 717/178 |
| 2013/0275958 A1* | 10/2013 | Ivanov | G06F 8/61 717/174 |
| 2014/0137114 A1* | 5/2014 | Bolte | G06F 9/45558 718/1 |
| 2014/0244716 A1 | 8/2014 | Stam et al. | |
| 2015/0089505 A1* | 3/2015 | Malaiyandisamy | G06F 9/5072 718/101 |
| 2015/0120887 A1* | 4/2015 | Hu | G06F 8/61 709/220 |
| 2015/0186129 A1* | 7/2015 | Apte | G06F 8/61 717/174 |
| 2015/0242133 A1* | 8/2015 | Smith | G06F 3/0613 711/114 |
| 2015/0324215 A1* | 11/2015 | Borthakur | G06F 9/45558 718/1 |
| 2015/0363181 A1* | 12/2015 | Alberti | G06F 9/45558 717/177 |
| 2016/0124764 A1* | 5/2016 | Nithrakashyap | G06F 3/0685 718/1 |
| 2016/0139945 A1* | 5/2016 | Griffith | G06F 9/5055 711/162 |

OTHER PUBLICATIONS

Gerlach, et al.; Skyport—Container-Based Execution Environment Management for Multi-Cloud Scientific Workflows; DataCloud; 2014; 8 pgs.; New Orleans, LA.

Engstrom, Jared; Self-Contained Infrastructure Containers; Beacon IP Report; Dec. 29, 2014; 6 pgs.

Diaz, et al.; Abstract Image Management and Universal Image Registration for Cloud and HPC Infrastructures; 2012; 8 pgs.; Pervasive Technology Institute, Indiana University.

* cited by examiner

200

```
┌─────────────────────────────────────────────────────────────┐
│ Install, on a first host computer system, a virtual machine │
│ image comprising a file repository comprising one or more   │
│ pre-requisites for installing a software application        │
│                                                         201 │
└─────────────────────────────────────────────────────────────┘
                              ↓
┌─────────────────────────────────────────────────────────────┐
│ Configure a second host computer system with an identifier  │
│ of the file repository                                      │
│                                                         202 │
└─────────────────────────────────────────────────────────────┘
                              ↓
┌─────────────────────────────────────────────────────────────┐
│ Install the software application on a virtual machine       │
│ associated with the second host computer system using the   │
│ file repository                                         203 │
└─────────────────────────────────────────────────────────────┘
                              ↓
┌─────────────────────────────────────────────────────────────┐
│ Update the installed software application on the virtual    │
│ machine associated with the second host computer system     │
│ using the file repository.                              204 │
└─────────────────────────────────────────────────────────────┘
```

Fig. 2

REPOSITORY MANAGER

TECHNICAL FIELD

This disclosure relates to the field of virtualization and, in particular, to the provisioning of software applications.

BACKGROUND

Software applications, such as external service software applications, may be employed in a virtualization environment to provide functionality to consumers in the virtualization environment, and/or to offload services which might otherwise be handled in a fashion internal to the virtualization environment. Installing and updating a software application may require installing one or more pre-requisite software packages.

BRIEF DESCRIPTION OF THE DRAWINGS

The present disclosure is illustrated by way of example, and not by way of limitation, in the figures of the accompanying drawings.

FIG. 2 is a flow diagram illustrating a method of installing a software application within the virtualization environment using a file repository within the virtualization environment, according to some implementations.

DETAILED DESCRIPTION

Figure 1:
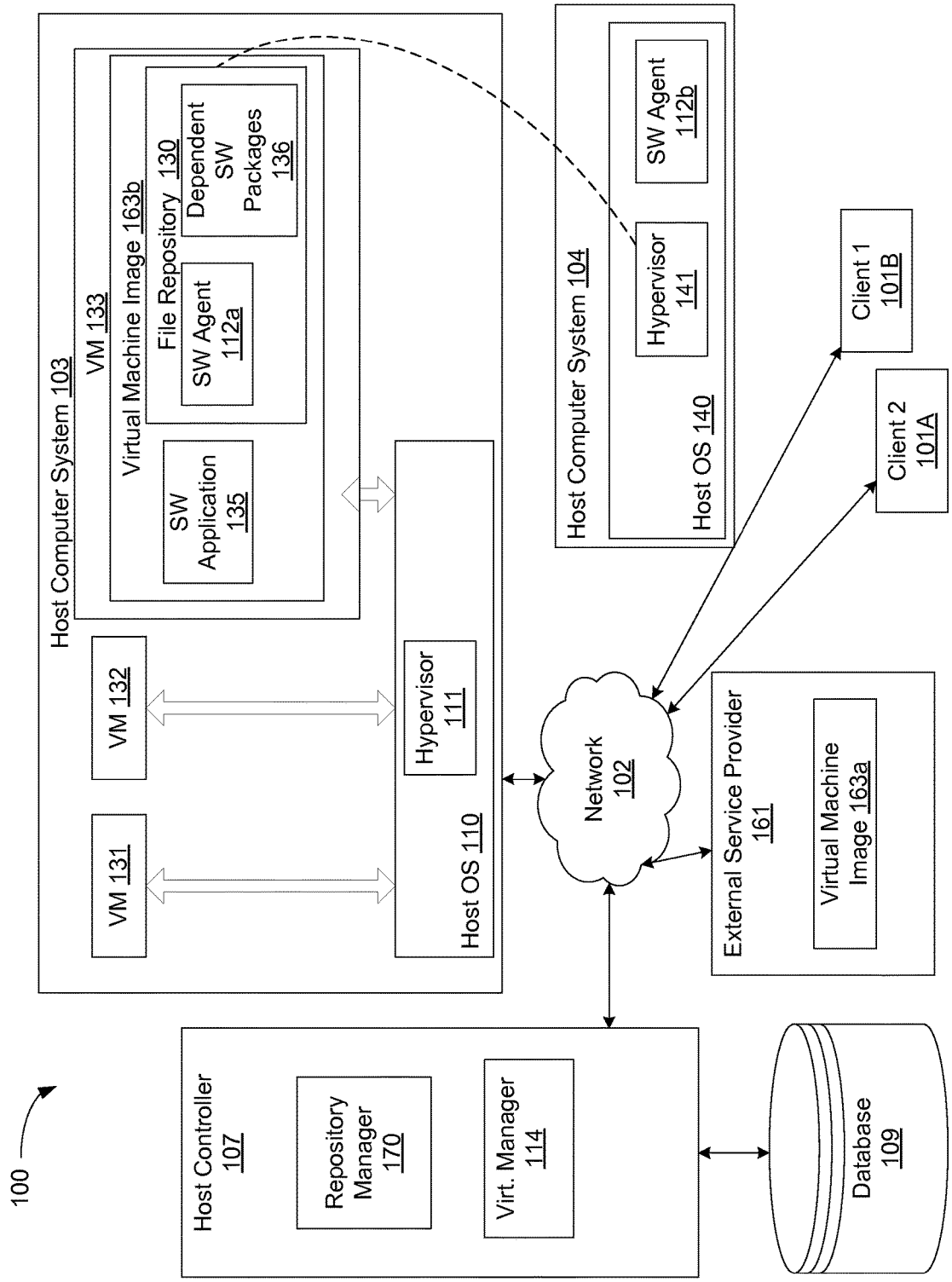
FIG. 1 illustrates an example network architecture in which implementations of the present invention may operate.

Software applications, such as external service software applications (hereinafter external services, may allow consumers such as, host computer systems, hypervisors, and virtual machines (VMs) to make use of services offered by the software applications. A software application may include one or more related processes to be executed by one or more computer systems in order to deliver certain functionality.

Installing and/or updating software applications may require accessing and installing pre-requisites (e.g., dependent software packages and/or software agents) stored in a repository located outside the virtualization environment and managed by third parties. The pre-requisites may be numerous, may conflict with one another, may require subscriptions, and may need to be compatible with other pre-requisites and the corresponding software application. Tools for managing of the acquisition of repository content for multiple host computer systems may be limited and require substantial administrative management overhead.

The present disclosure addresses the above-mentioned and other deficiencies by installing a virtual machine image containing a file repository and configuring host computer systems to use the file repository for installing the software application.

"External service" (also referred to as "external service software application") herein shall refer to a software application that offers functionality to a consumer in a virtualization environment, and/or to offload services which might otherwise be handled in a fashion internal to the virtualization environment. External service providers offer external services including networking as a service, storage as a service, virtual machine (VM) hosting as a service, VMs as a service, load balancing as a service, virtual private network (VPN) as a service, and computation as a service (e.g., allowing for the offloading of processor-intensive VMs or other processes). Offered external services include virtual and/or non-virtual (e.g., physically-based) services. Consumers, such as, host computer systems, hypervisors, and VMs may make use of the external services. In an example where such consumers are associated with a virtualization environment, the use of such external services may allow the consumers to use functionality not offered by the virtualization environment. In another example, the use of external services may ease virtualization environment management and implementation by tasking an external service provider with the responsibility of handling, for example, one or more networks of the virtualization environment.

"File repository" herein shall refer to a location in which an aggregation of data (e.g., software, files, documents, libraries, binaries, etc.) is stored and accessible by a computer system, software application, and/or user. In one example, a file repository may include some or all pre-requisites (e.g., pre-requisite software packages) required to install and/or operate a software application on a host computer system. In one implementation, the file repository may include versions of pre-requisites corresponding to the version of the associated software application. In some implementations, the file repository may also include the software application distribution files.

"Pre-requisite software packages" (also referred to as "pre-requisites") herein shall refer to software agents and dependent software packages, such as extensions, binaries, and/or libraries, required to install and run (e.g., operate) another software application. Versions of pre-requisites may be required to be compatible with a specific version of a corresponding software application.

"Software agent" herein shall refer to a software application or module deployed on computer system (e.g., host computer system) used to facilitate the installation and management of an associated software application, such as an external service. Compatible versions of software agents may be used to install and update a corresponding version of a software application and corresponding versions of pre-requisites for the software application.

"Virtual machine image" herein shall refer to one or more files including images of virtual machine disks from which one or more identical virtual machines may be installed on a host computer system.

In one implementation, a virtual machine image may be installed on a first host computer system. The virtual machine image may include a file repository containing pre-requisites for installing a software application. A second host computer system may be configured with an identifier of the file repository directing the hypervisor of the second host computer system to install the software application using the file repository. Configuring the second host computer system may include querying the first host computer system to determine if the file repository is installed on the first host computer system and querying the first host computer system to determine if the file repository contains a software agent to facilitate the installation of the software application. Configuring the second host computer system may also include specifying a value of a configuration parameter of the software application, providing an identifier of the software agent, providing an identifier of a dependent software package, or providing the identifier of the file repository to the second host computer system. If the second host computer system is configured with an identifier of the file repository, the software application may be installed on a virtual machine associated with the second host computer system using the file repository. Installing the software application on the second host computer system may include installing the software agent from the file repository on the host computer system, installing the software application using the software agent, and installing one or more dependent software packages on the second host computer system from the file repository using the software agent. The file repository may also be used to periodically update the installed software application.

Various aspects of the above referenced methods and systems are described in details herein below by way of examples, rather than by way of limitation.

FIG. 1 illustrates an example network architecture 100 in which implementations of the present invention may operate. The network architecture 100 includes one or more host computer systems 103-104 coupled to clients 101A-B over a network 102. The network 102 may be a private network (e.g., a local area network (LAN), wide area network (WAN), intranet, etc.) or a public network (e.g., the Internet). The host computer systems 103-104 may also be coupled to a host controller 107 (via the same or a different network or directly). Host controller 107 may be an independent machine such as a server computer, a desktop computer, etc. Alternatively, the host controller 107 may be part of host computer systems 103-104. In one example, the network architecture 100, including host controller 107, host computer systems 103-104, and clients 101A-B, may be referred to as a virtualization environment.

The network architecture 100 additionally includes one or more external service providers 161 coupled over network 102. External service provider 161 may be a third-party provider of software applications, such as external services. External service provider 161 may be an independent machine such as a server computer, a desktop computer, etc. used to deliver a virtual machine image 163a to the virtualization environment.

In one example, clients 101A-B may include computing devices that have a wide range of processing capabilities. Some or all of the clients 101A-B may be thin clients, which serve as access terminals for users and depend primarily on the host computer systems 103-104 for processing activities. For example, the client 101A-B may be a desktop computer, laptop computer, cellular phone, personal digital assistant (PDA), etc. The client 101A-B may run client applications such as a Web browser. The client 101A-B may also run other client applications, which receive multimedia data streams or other data from the host computer systems 103-104 and re-direct the received data to a local display or other user interface.

Host computer systems 103-104 may include server computers or any other computing devices capable of running one or more virtual machines 131-133. Each host computer system 103-104 may include a host operating system (OS) 110 and 140, respectively. Each virtual machine 131-133 runs a guest operating system (OS) that may be different from one virtual machine to another. For example, the host computer system 103 may include a hypervisor 111 that emulates the underlying hardware platform for the virtual machines 131-133. The hypervisor 132 may also be known as a virtual machine monitor (VMM) or a kernel-based hypervisor.

Each virtual machine 131-133 may be accessed by one or more of the clients 101A-B over the network 102 and may provide a virtual desktop for the client(s) 101A-B. From the user's point of view, the virtual desktop functions as a physical desktop (e.g., a personal computer) and is indistinguishable from a physical desktop. Each virtual machine 131-133 may be linked to one or more virtual disks. These virtual disks can be logical partitions of a physical disk managed by hypervisor 111, can be cloud based storage devices, or can be some other type of virtual storage device. In one example, virtual disks may form a whole or part of a logical data center. In one example, virtual machines 131-133 and virtual disks, together with host computer systems 103, may be collectively referred to as entities in a virtual machine system.

The virtual machines 131-133 and virtual disks may be managed by the host controller 107. Host controller 107 may manage the allocation of resources from host computer system 103 to virtual machines 131-133. In addition, host controller 107 may monitor the status of virtual machines 131-133 as well as the progress of commands and processes being executed by virtual machines 131-133. The host controller 107 may include a virtualization manager 114 to perform management operations in the virtualization system, including for example allocating resources of host computer system 103 to virtual machines 131-133, monitoring the status of virtual machines 131-133, monitoring the progress of commands and processes being executed by virtual machines 131-133, etc. Virtualization manager may also be used to configure the installation of hypervisor 111 and 141 on host computer systems 103-104, respectively. The host controller 107 may also maintain a management database 109 used by the virtualization manager 114 for the above management operations.

In one example, host controller 107 also includes a repository manager 170 to configure the host computer systems 103 and 104 and install software application 135 using file repository 130. Repository manager 170 may be a software application or module (e.g., extension). Repository manager 170 may be installed on host controller 107. Alternatively, repository manager may be installed on another computer system. In some implementations, repository manager 170 may be part of and/or used in conjunction with virtualization manager 114.

In one implementation, virtual machine image 163a may be received by host controller 107 from external service provider 161. Host controller 107 using virtualization manager 114 may install a copy of virtual machine image 163a on host computer system 103 (e.g., virtual machine image 163b). The virtual machine image 163a-b may include software application 135 (e.g., an external service) and a file repository 130. The file repository 130 may include all or some of the pre-requisites required to install and run software application 135, such as software agent 112a and dependent software packages 136. Software agent 112a (and/or 112b) may be a single software agent or multiple software agents. Dependent software packages 136 may be a single dependent software package or multiple dependent software packages. The contents of the file repository 130 may be specific to a particular software application 135 and may contain the correct versions of pre-requisites required by software application 135. In some implementations, file repository 130 may also include software application 135 distribution files.

Repository manager 170 may configure host computer system 104 with an identifier of file repository 130. The identifier may act like a pointer to file repository 130. Repository manager 170 may use the identifier of file repository 130 to direct hypervisor 141 of computer system 104 to install software application 135 using file repository 130. The file repository 130 may include pre-requisites for installation and operation of software application 135. In some cases, file repository 130 may also include software application 135 distribution files. An administrator using repository manager 170 may set the configuration settings, such as settings to configure host computer system 104 with an identifier of the file repository, during the installation of a new hypervisor (e.g., hypervisor 141) on a host computer system (e.g., host computer system 104) or after the hypervisor is installed on the host computer system 104. It should be noted that repository manager 170 may perform the same or similar operations discussed herein with respect to host computer system 104 on host computer system 103. For example, repository manager 170 may configured host computer system 103 with an identifier to file repository 130.

Configuring host computer system 104 with an identifier of the file repository 130 may include repository manager 170 querying host computer system 103 to determine if file repository 130 is located on host computer system 103. Repository manager 170 may send a call, such as function call or API call, to hypervisor 111 to determine if file repository 130 is located on host computer system 103. If repository manager 170 determines that file repository 130 is located on host computer system 103, repository manager 170 may query hypervisor 111, using another call, to determine if file repository 130 contains software agent 112a. It should be noted that software agent 112b on host computer system 104 may be a copy of software agent 112a, as will be discussed further below.

Configuring host computer system 104 with an identifier of the file repository 130 may also include repository manager 170 specifying a value of a configuration parameter of the software application 135 to hypervisor 141 of host computer system 104. Repository manager 170 may use a call, such as a function call or API call, to hypervisor 141 specifying the value of the configuration parameter. The value of a configuration parameter may indicate the type of software application (e.g., networking as a service, storage as a service, etc.) and/or version of the software application (e.g., version 1.1, 1.2, etc.).

Configuring host computer system 104 with an identifier of the file repository 130 may further include repository manager 170 providing an identifier of a software agent 112a to hypervisor 141 of host computer system 104. Repository manager 170 may use a call, such as a function call or API call, to hypervisor 141 specifying the identifier of software agent 112a. The identifier of software agent 112a may indicate the type and/or version of the software agent. Configuring host computer system 104 with an identifier of the file repository 130 may also include repository manager 170 providing the identifier of a dependent software package 136 to hypervisor 141 of host computer system 104. Repository manager 170 may use a call, such as a function call or API call, to hypervisor 141 to provide the identifier of the dependent software package 136. The identifier of the dependent software package 136 may indicate the type and/or version of dependent software package 136. Repository manager 170 may provide identifiers for one or more dependent software packages 136 to hypervisor 141.

Configuring host computer system 104 with an identifier of the file repository 130 may include repository manager 170 providing the identifier of the file repository 130 directing hypervisor 141 of host computer system 104 to install at least one of the software agent 112a or dependent software packages 136 from file repository 130. Repository manager 170 may use a call, such as a function call or API call, to hypervisor 141 to provide the identifier of file repository 130. In another implementation, file repository 130 may include software application 135 distribution files and hypervisor 141 may also be directed (e.g., using a call from repository manager 170) to install software application 135 from file repository 130.

After configuring host computer system 104 with an identifier of the file repository 130, repository manager 170 may direct hypervisor 141 to install software application 135 on a virtual machine (not shown) associated with host computer system 104 using repository 130. Installing software application 135 on host computer system 104 may include repository manager 170 directing hypervisor 141 (using a call in conjunction with using the identifier of software agent 112a and/or identifier of the file repository 130) to install software agent 112a from file repository 130. Software agent 112a may be the correct type and/or version of software agent to facilitate the installation of software application 135. It should be noted that software agent 112b may be a copy of software agent 112a.

Installing software application 135 on host computer system 104 may also include repository manager 170 directing hypervisor 141 (e.g., using a call in conjunction with the specified value of the configuration parameter of the software application 135) to install the software application 135. In some implementations, software application 135 may be installed on host computer system 104 using software agent 112b. If software application 135 distribution files are located in file repository 130, repository manager 170 may direct hypervisor 141 to install software application 135 from file repository 130 using a call in conjunction with the identifier of file repository 130. Alternatively, software application 135 may be installed from virtual machine image 163b located on virtual machine 133, from database 109, or another location where software application 135 distribution files are stored.

Installing software application 135 on host computer system 104 may also include repository manager 170 directing hypervisor 141 (e.g., using a call in conjunction with the identifier of the dependent software package 136 and/or the identifier of the file repository 130) to install the dependent software packages 136 from file repository 130. In some implementations, software agent 112b may facilitate the installation of dependent software packages 136.

If the software application 135 is installed and operating on host computer system 104, repository manager 170 may update the software application on a virtual machine associated with host computer system 104 using the file repository 130. Repository manager 170 may direct host computer system 104 to make updates periodically, such as daily, weekly, monthly, etc., using file repository 130 (e.g., using calls in conjunction with the identifier of the file repository 130). Repository manager 170 may direct host computer system 104 to make updates upon certain events, such as when the content of file repository 130 is updated. Updating the software application may include adding, for example, extensions and/or additional dependent software.

FIG. 2 is a flow diagram illustrating a method of installing a software application within the virtualization environment using a file repository within the virtualization environment, according to some implementations. The method 200 may be performed by processing logic that comprises hardware (e.g., circuitry, dedicated logic, programmable logic, microcode, etc.), software (such as instructions run on a processing device), or a combination thereof. All or part of method 200 may be performed by repository manager 170.

Method 200 begins at block 201 where processing logic executing the method installs on a host computer system 103 virtual machine image 163b. Virtual machine image 163b may include file repository 130 including one or more pre-requisites for installing software application 135. Method 200 continues to block 202 where processing logic configures host computer system 104 with an identifier of the file repository 130. Method 200 continues to block 203 where processing logic installs software application 135 on a virtual machine associated with host computer system 104 using file repository 130. Method 200 continues to block 204, where processing logic updates the installed software application on the virtual machine associated with host computer system 104 using file repository 130. Additional details of method 200 may be described with respect to FIG. 1.

Figure 3:
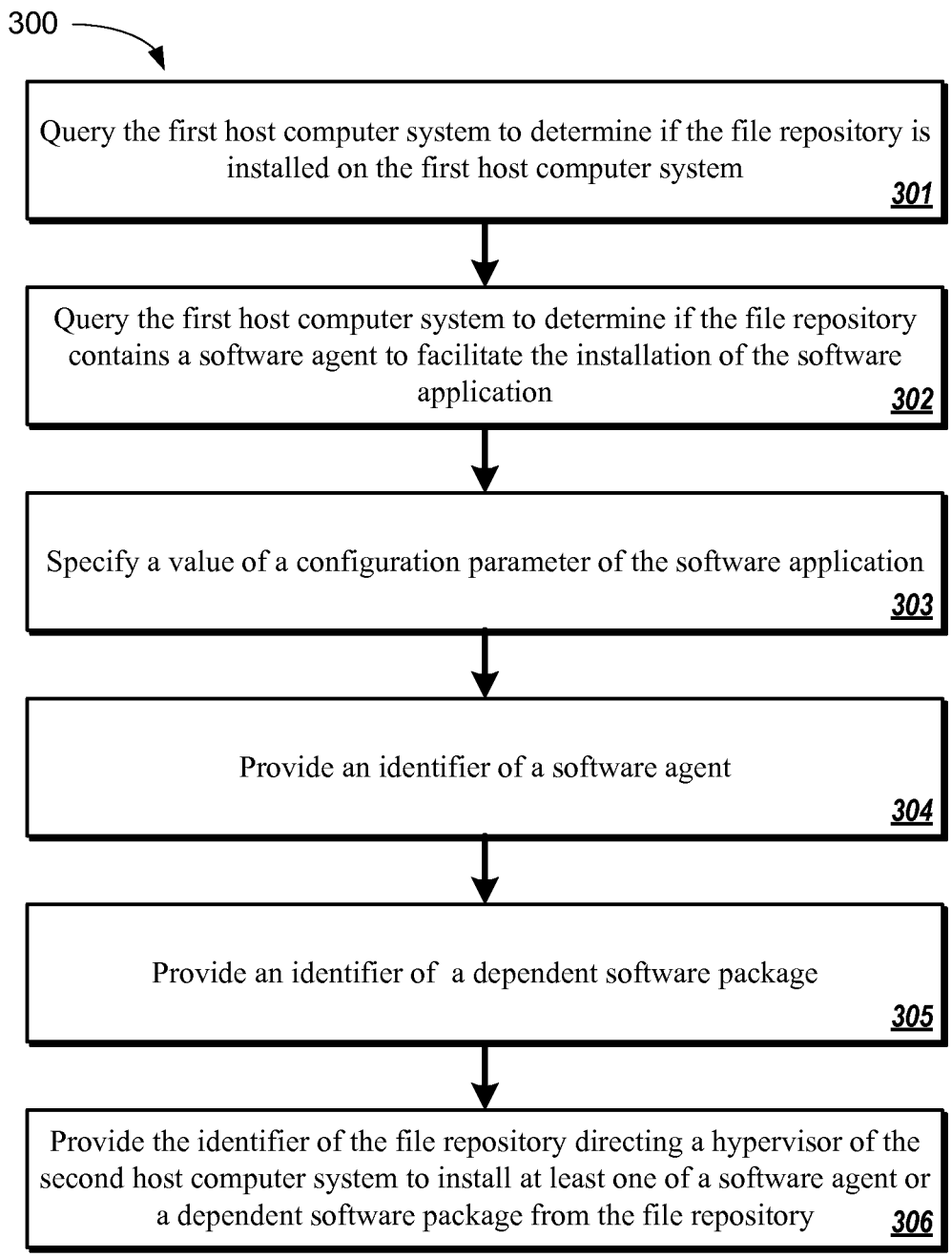
FIG. 3 is a flow diagram illustrating a method of configuring a host computer system with an identifier of the file repository, according to some implementations.

FIG. 3 is a flow diagram illustrating a method of configuring a host computer system with an identifier of the file repository, according to some implementations. The method 300 may be performed by processing logic that comprises hardware (e.g., circuitry, dedicated logic, programmable logic, microcode, etc.), software (such as instructions run on a processing device), or a combination thereof. The method 300 may be performed all or in part by repository manger 170.

Method 300 begins at block 301 where processing logic performing the method queries host computer system 103 to determine if file repository 130 is installed on host computer system 130. Method 300 continues to block 302 where processing logic queries host computer system 103 to determine if file repository 130 contains software agent 112a to facilitate the installation of the software application 135.

Method 300 continues to block 303 where processing logic specifies a value of a configuration parameter of the software application 135. Method 300 continues to block 304 where processing logic provides an identifier of software agent 112a. Method 300 continues to block 305 where processing logic provides an identifier of dependent software package 136. Method 300 continues to block 306 where processing logic provides the identifier of file repository 130 directing hypervisor 141 of host computer system 104 to install at least on of software agent 112a or dependent software package 136 from file repository 139. Additional details of method 300 may be described with respect to FIG. 1.

Figure 4:
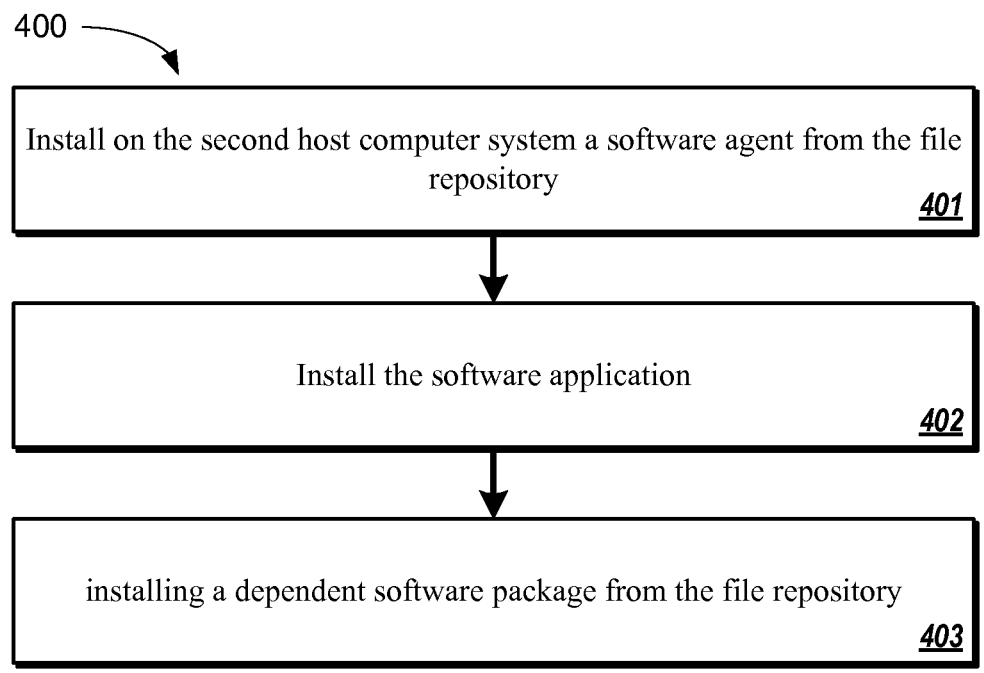
FIG. 4 is a flow diagram illustrating a method of installing the software application on a virtual machine using the file repository, according to some implementations.

FIG. 4 is a flow diagram illustrating a method of installing the software application on a virtual machine using the file repository, according to some implementations. The method 400 may be performed by processing logic that comprises hardware (e.g., circuitry, dedicated logic, programmable logic, microcode, etc.), software (such as instructions run on a processing device), or a combination thereof. The method 400 may be performed all or in part by repository manager 170.

Method 400 begins at block 401 where processing logic performing the method installs on host computer system 104 software agent 112b from file repository 130. Method 400 continues to block 402 where processing logic installs the software application 135 using software agent 112b. Method 400 continues to block 403 where processing logic installs dependent software package 136 from file repository 130. Additional details of method 400 may be described with respect to FIG. 1.

Figure 5:
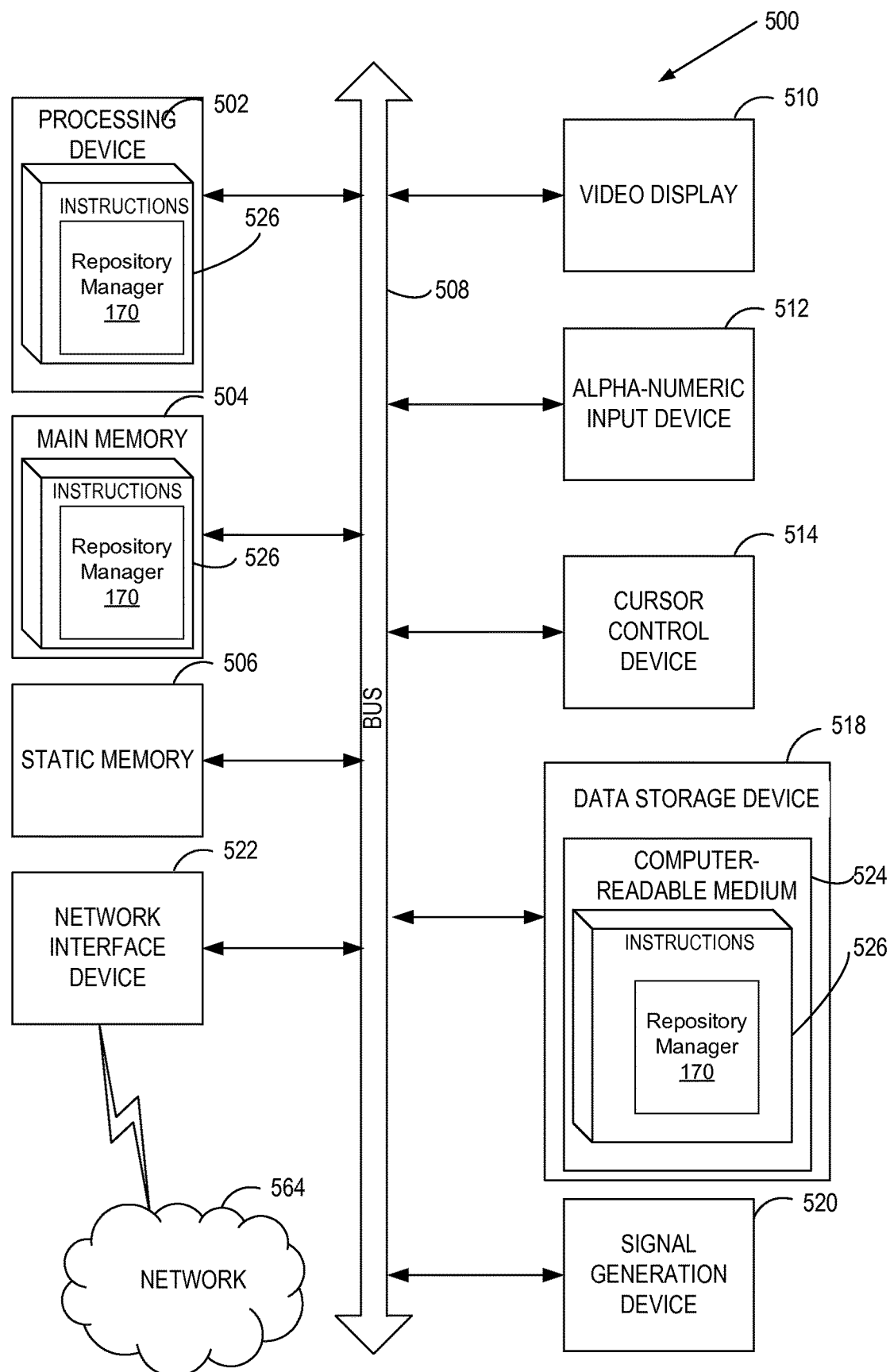
FIG. 5 illustrates a block diagram of a computer system in which some implementations of the disclosure may operate.

FIG. 5 illustrates a block diagram of a computer system in which some implementations of the disclosure may operate. Computing device 500 may be a machine within which a set of instructions, for causing the machine to perform any one or more of the methodologies discussed herein, may be executed. In alternative examples, the machine may be connected (e.g., networked) via network 564 to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory (e.g., a data storage device 518), which communicate with each other via a bus 508.

The processing device 502 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 502 may therefore include multiple processors. The processing device 502 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like.

The computing device 500 may further include a network interface device 522 able to communicated with a network 564 (e.g., Internet, Local Area Network (LAN), Wide Area Network (WAN), Wireless WAN, Wireless LAN). The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 518 may include a machine-readable storage medium (or more specifically a computer-readable storage medium) 524 on which is stored one or more sets of instructions 526 embodying any one or more of the methodologies or functions described herein (e.g., repository manager 170). The instructions 526 may also reside, completely or at least partially, within the main memory 504, within the static memory 506 and/or within the processing device 502 during execution thereof by the computer system 500, the main memory 504, static memory 506 and the processing device 502 also constituting computer-readable storage media.

While the computer-readable storage medium 524 is shown in an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies of the present invention (e.g., non-transitory). The term "computer-readable storage medium" shall accordingly be taken to include, but not be limited to, solid-state memories, and optical and magnetic media.

The modules, components and other features described herein (for example in relation to FIG. 1) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "querying", "installing", "configuring", "specifying", "updating", "providing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:

causing, on a first host computer system of a virtualization environment, an installation of a virtual machine image at a first virtual machine in the virtualization environment, wherein the virtual machine image comprises a file repository comprising one or more uninstalled pre-requisites for installing a software application of an external service at a second virtual machine in the virtualization environment;

configuring, by a processing device, a second host computer system of the virtualization environment with an identifier of the file repository installed at the first virtual machine to direct a hypervisor of the second host computer system to install the software application at the second virtual machine using the file repository installed at the first virtual machine in the virtualization environment; and directing, by the processing device, the hypervisor of the second host computer system of the virtualization environment to install the software application of the external service at the second virtual machine in the virtualization environment using the identifier of the file repository installed at the first virtual machine in the virtualization environment, wherein the hypervisor of the second host computer system to utilize the identifier of the file repository installed at the first virtual machine to locate the one or more uninstalled pre-requisites to install the software application at the second virtual machine, wherein directing the hypervisor comprises:

causing an installation of the software application of the external service at the second virtual machine based on the identifier of the file repository installed at the first virtual machine in the virtualization environment.

2. The method of claim 1, further comprising:
causing an update of the software application on the second virtual machine associated with the second host computer system using the file repository.

3. The method of claim 1, wherein configuring the second host computer system further comprises at least one of:
specifying a value of a configuration parameter of the software application;
providing an identifier of a software agent;
providing an identifier of a dependent software package; or
providing the identifier of the file repository directing the hypervisor of the second host computer system to install at least one of a software agent or a dependent software package from the file repository.

4. The method of claim 1, wherein configuring the second host computer system further comprises:
querying the first host computer system to determine whether the file repository is installed on the first host computer system.

5. The method of claim 1, further comprising:
querying the first host computer system to determine whether the file repository contains a software agent to facilitate the installation of the software application at the second virtual machine.

6. The method of claim 1, wherein directing the hypervisor of the second host computer system of the virtualization environment to install the software application at the second virtual machine in the virtualization environment using the identifier of the file repository installed at the first virtual machine in the virtualization environment further comprises:
causing an installation on the second host computer system of a software agent from the file repository.

7. The method of claim 1, wherein directing the hypervisor of the second host computer system of the virtualization environment to install the software application at the second virtual machine in the virtualization environment using the identifier of the file repository installed at the first virtual machine in the virtualization environment further comprises:
causing an installation of a dependent software package from the file repository using a software agent.

8. The method of claim 1, wherein the uninstalled pre-requisites for installing the software application comprise a software agent to facilitate the installation of the software application and a dependent software package to operate the software application.

9. The method of claim 1, wherein the software application is an external service software application comprising at least one of networking as a service, storage as a service, or virtual machine hosting as a service.

10. A system comprising:
a memory; and
a processing device operatively coupled with the memory, the processing device to:
cause, on a first host computer system of a virtualization environment, an installation of a virtual machine image at a first virtual machine in the virtualization environment, wherein the virtual machine image comprises a file repository comprising one or more uninstalled pre-requisites for installing a software application of an external service at a second virtual machine in the virtualization environment;
configure, by the processing device, a second host computer system of the virtualization environment with an identifier of the file repository installed at the first virtual machine to direct a hypervisor of the second host computer system to install the software application at the second virtual machine using the file repository installed at the first virtual machine in the virtualization environment; and
direct, by the processing device, the hypervisor of the second host computer system of the virtualization environment to install the software application of the external service at the second virtual machine in the virtualization environment using the identifier of the file repository installed at the first virtual machine in the virtualization environment, wherein the hypervisor of the second host computer system to utilize the identifier of the file repository installed at the first virtual machine to locate the one or more uninstalled pre-requisites to install the software application at the second virtual machine, wherein to direct the hypervisor, the processing device further to:
cause an installation of the software application of the external service at the second virtual machine based on the identifier of the file repository installed at the first virtual machine in the virtualization environment.

11. The system of claim 10, the processing device further to:
cause an update of the software application on the second virtual machine associated with the second host computer system using the file repository.

12. The system of claim 10, wherein to configure the second host computer system, the processing device further to at least one of:
specify a value of a configuration parameter of the software application;
provide an identifier of a software agent;
provide an identifier of a dependent software package; or
provide the identifier of the file repository directing the hypervisor of the second host computer system to install at least one of a software agent or a dependent software package from the file repository.

13. The system of claim 10, wherein to configure the second host computer system, the processing device further to:
query the first host computer system to determine whether the file repository is installed on the first host computer system; and
query the first host computer system to determine whether the file repository contains a software agent to facilitate the installation of the software application at the second virtual machine.

14. The system of claim 10, wherein to direct the hypervisor of the second host computer system of the virtualization environment to install the software application at the second virtual machine in the virtualization environment using the identifier of the file repository installed at the first virtual machine in the virtualization environment, the processing device further to:
cause an installation on the second host computer system of a software agent from the file repository.

15. The system of claim 10, wherein to direct the hypervisor of the second host computer system of the virtualization environment to install the software application at the second virtual machine in the virtualization environment using the identifier of the file repository installed at the first virtual machine in the virtualization environment, the processing device further to:
    cause an installation of a dependent software package from the file repository using a software agent.

16. A non-transitory machine-readable storage including instruction that, responsive to execution by a processing device, cause the processing device to:
    cause, on a first host computer system of a virtualization environment, an installation of a virtual machine image at a first virtual machine in the virtualization environment, wherein the virtual machine image comprises a file repository comprising one or more uninstalled pre-requisites for installing a software application of an external service at a second virtual machine in the virtualization environment;
    configure, by the processing device, a second host computer system of the virtualization environment with an identifier of the file repository installed at the first virtual machine to direct a hypervisor of the second host computer system to install the software application at the second virtual machine using the file repository installed at the first virtual machine in the virtualization environment; and
    direct, by the processing device, the hypervisor of the second host computer system of the virtualization environment to install the software application of the external service at the second virtual machine in the virtualization environment using the identifier of the file repository installed at the first virtual machine in the virtualization environment, wherein the hypervisor of the second host computer system to utilize the identifier of the file repository installed at the first virtual machine to locate the one or more uninstalled pre-requisites to install the software application at the second virtual machine, wherein to direct the hypervisor, the processing device further to:
        cause an installation of the software application of the external service at the second virtual machine based on the identifier of the file repository installed at the first virtual machine in the virtualization environment.

17. The non-transitory machine-readable storage of claim 16, the processing device further to:
    cause an update of the software application on the second virtual machine associated with the second host computer system using the file repository.

18. The non-transitory machine-readable storage of claim 16, wherein to configure the second host computer system, the processing device further to at least one of:
    specify a value of a configuration parameter of the software application;
    provide an identifier of a software agent;
    provide an identifier of a dependent software package; or
    provide the identifier of the file repository directing the hypervisor of the second host computer system to install at least one of a software agent or a dependent software package from the file repository.

19. The non-transitory machine-readable storage of claim 16, wherein to configure the second host computer system, the processing device further to:
    query the first host computer system to determine whether the file repository is installed on the first host computer system; and
    query the first host computer system to determine whether the file repository contains a software agent to facilitate the installation of the software application at the second virtual machine.

20. The non-transitory machine-readable storage of claim 16, wherein to direct the hypervisor of the second host computer system of the virtualization environment to install the software application at the second virtual machine in the virtualization environment using the identifier of the file repository installed at the first virtual machine in the virtualization environment, the processing device further to:
    cause an installation on the second host computer system of a software agent from the file repository; and
    cause an installation of a dependent software package from the file repository using the software agent.

* * * * *